US008368679B2

(12) United States Patent
Yaguma et al.

(10) Patent No.: US 8,368,679 B2
(45) Date of Patent: Feb. 5, 2013

(54) POWER SUPPLY APPARATUS, LIQUID CRYSTAL DRIVING APPARATUS AND DISPLAY APPARATUS

(75) Inventors: Hiroshi Yaguma, Kyoto (JP); Hiromitsu Nakaoka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 976 days.

(21) Appl. No.: 12/440,075

(22) PCT Filed: Sep. 4, 2007

(86) PCT No.: PCT/JP2007/067167

§ 371 (c)(1),
(2), (4) Date: Mar. 5, 2009

(87) PCT Pub. No.: WO2008/029782

PCT Pub. Date: Mar. 13, 2008

(65) Prior Publication Data

US 2010/0182296 A1 Jul. 22, 2010

(30) Foreign Application Priority Data

Sep. 8, 2006 (JP) ................................ 2006-243857

(51) Int. Cl.
*G06F 3/038* (2006.01)
*G09G 5/00* (2006.01)

(52) U.S. Cl. ...................................................... 345/211

(58) Field of Classification Search ............ 345/87–104, 345/211–213

See application file for complete search history.

(56) References Cited

U.S. PATENT DOCUMENTS

| | | | | |
|---|---|---|---|---|
| 6,317,120 | B1 * | 11/2001 | Eu | 345/211 |
| 6,753,836 | B2 | 6/2004 | Kwon | |
| 2002/0105512 | A1 * | 8/2002 | Kwon | 345/212 |
| 2005/0146225 | A1 | 7/2005 | Yamamoto et al. | |
| 2005/0200622 | A1 | 9/2005 | Yajima | |
| 2006/0007094 | A1 * | 1/2006 | Kang et al. | 345/98 |

FOREIGN PATENT DOCUMENTS

| | | |
|---|---|---|
| JP | 09-130215 | 5/1997 |
| JP | 10-327051 | 12/1998 |
| JP | 2002-268614 | 9/2002 |
| JP | 2002-358050 | 12/2002 |
| JP | 2005-137066 | 5/2005 |
| JP | 2005-261129 | 9/2005 |

* cited by examiner

*Primary Examiner* — Chanh Nguyen
*Assistant Examiner* — Sanghyuk Park
(74) *Attorney, Agent, or Firm* — Fish & Richardson P.C.

(57) ABSTRACT

A power supply apparatus of the present invention comprises: a constant voltage generation section (first DAC (21), second DAC (22), resistor (R2), resistor (R3)) that generates a positive constant voltage (Va); a pulse voltage generation section (pulse oscillator (23), amplifier (24)) that generates a positive pulse voltage (Vb); a capacitor (C1) of which one end is connected to the output terminal of the pulse voltage generation section; and a diode (D1) of which an anode is connected to the other end of the capacitor (C1), and of which a cathode is connected to the output terminal of the constant voltage generation section. A positive-negative bipolar pulse voltage (Vc) is outputted from the other end of the capacitor (C1). Thus, it is possible to generate a positive-negative bipolar pulse voltage with a simple and small-scale circuit configuration.

7 Claims, 4 Drawing Sheets

POWER SUPPLY APPARATUS, LIQUID CRYSTAL DRIVING APPARATUS AND DISPLAY APPARATUS

TECHNICAL FIELD

The present invention relates to a power supply apparatus that generates a positive-negative bipolar pulse voltage, and also relates to a liquid crystal driving apparatus and a display apparatus using such a power supply apparatus.

BACKGROUND ART

FIG. 6 is a block diagram showing an example of a conventional liquid crystal driving apparatus.

Conventionally, a liquid crystal driving apparatus that switches, every frame period, the polarity of the common voltage fed to a liquid crystal panel (a so-called "common AC driving" type liquid crystal driving apparatus) is, as shown in FIG. 6, so configured as to generate a positive-negative bipolar pulse voltage Vout by use of a positive supply voltage Vp and a negative supply voltage Vm and feeds the generated voltage to a common electrode of a liquid crystal panel as a common voltage.

As another example of conventional liquid crystal driving apparatuses, Patent Document 1 discloses and suggests a liquid crystal apparatus driver circuit including: first to Nth input pads for receiving first to Nth voltages having different voltage levels from outside (where N represents an integer greater than 1); first to Nth electrostatic discharge protective parts connected to the first to Nth input pads to form discharge paths when electrostatic pulses are applied via the input pads; and an output driver having first to Nth resistors for receiving the first to Nth voltages applied via the first to Nth input pads, respectively, the output driver generating a driving voltage for driving a liquid crystal display apparatus from the first to Nth voltages applied via the first to Nth resistors, respectively, wherein the first to Nth resistors are provided for reducing the current flowing through the output driver when the electrostatic pulses are applied.

Patent Document 1: Japanese Patent Application Laid-open (JP-A) No. 2002-268614

DISCLOSURE OF THE INVENTION

Problems to be Solved by the Invention

Certainly, the common-AC-driving liquid crystal driving apparatus shown in FIG. 6 makes it possible to prevent degradation due to polarization of liquid crystal and to enhance the reliability of the apparatus.

However, the above-described conventional liquid crystal driving apparatus needs to be provided with a positive voltage generation circuit for generating a positive supply voltage Vp and a negative voltage generation circuit for generating a negative supply voltage Vm, from a supply voltage Vcc fed to the apparatus so as to generate a positive-negative bipolar pulse voltage Vout, causing problems such as a complicated circuit configuration, a larger chip size, a higher chip manufacturing costs and moreover a smaller space available on a substrate.

In particular, in driving apparatuses for liquid crystal panels used as a display means in mobile phone terminals, portable game devices, personal digital assistants (PDA), car audio apparatuses and the like, there is a strong demand for further compactness, lightness and slimness. Therefore, it is very important to solve the above-described problems.

In light of the foregoing, the present invention aims at providing a power supply apparatus capable of generating a positive-negative bipolar pulse voltage with a simple and small-scale circuit configuration, and providing a liquid crystal driving apparatus and a display apparatus using such a power supply apparatus.

Means for Solving the Problem

In order to solve the above-described problems, according to one aspect of the present invention, a power supply apparatus includes: a constant voltage generation section that generates a positive constant voltage; a pulse voltage generation section that generates a positive pulse voltage; a capacitor of which one end is connected to the output terminal of the pulse voltage generation section; and a diode of which the anode is connected to the other end of the capacitor, and of which the cathode is connected to the output terminal of the constant voltage generation section, wherein a positive-negative bipolar pulse voltage is outputted from the other end of the capacitor (Configuration 1).

In the power supply apparatus of the above configuration 1, the pulse voltage generation section, the constant voltage generation section and the diode may be incorporated in a semiconductor integrated circuit, and the capacitor may be externally attached to the semiconductor integrated circuit (Configuration 2).

In the power supply apparatus of the above configuration 2, the diode may be so integrated as to block the current path thereto from the semiconductor substrate (Configuration 3).

In the power supply apparatus of the above configuration 3, the diode may be connected on the pad-side of an electrostatic protection element (Configuration 4).

In the power supply apparatus of the above configuration 4, the diode may have substantially the same element size as the electrostatic protection element (Configuration 5).

In the power supply apparatus of any one of the above configurations 1 to 5, the constant voltage generation section may include: a first voltage source that generates a first constant voltage; a second voltage source that generates a second constant voltage lower than the first constant voltage; and a voltage divider that generates the intermediate voltage between the first and second constant voltages, wherein the intermediate voltage is outputted as positive constant voltage, and at least one of the first and second constant voltages and the division ratio of the voltage divider may be variable (Configuration 6).

According to another aspect of the present invention, a liquid crystal driving apparatus that switches, every frame period, the polarity of a common voltage fed to a liquid crystal panel includes: as a means for generating the common voltage, a power supply apparatus that adopts any one of the above configurations 1 to 6 (Configuration 7).

According to yet another aspect of the present invention, a display apparatus provided with a liquid crystal panel includes: the liquid crystal driving apparatus of the above configuration 7 as a means for switching, every frame period, the polarity of the common voltage fed to the liquid crystal panel (Configuration 8).

ADVANTAGES OF THE INVENTION

A power supply apparatus of the present invention can generate a positive-negative bipolar pulse voltage with a simple and small-scale circuit configuration, thus contributing to miniaturization and sliming-down of liquid crystal driving apparatuses and display apparatuses incorporating it.

LIST OF REFERENCE SYMBOLS

10 liquid crystal panel
20 liquid crystal panel driving IC
21 first digital/analog converter (first DAC)
22 second digital/analog converter (second DAC)
23 pulse oscillator
24 amplifier
R1-R3 resistors
D1 diode
ESD1-DSD4 electrostatic protection diodes
T1-T4 pads
CE common electrode
100 P-type semiconductor substrate (P-sub)
101 low concentration N-type semiconductor region (deep N-well)
102 low concentration P-type semiconductor region (P-well)
103 high concentration N-type semiconductor region (contact for deep N-well)
104 high concentration P-type semiconductor region (anode of the diode D1)
105 high concentration N-type semiconductor region (cathode of the diode D1)

BEST MODE FOR CARRYING OUT THE INVENTION

Figure 1:
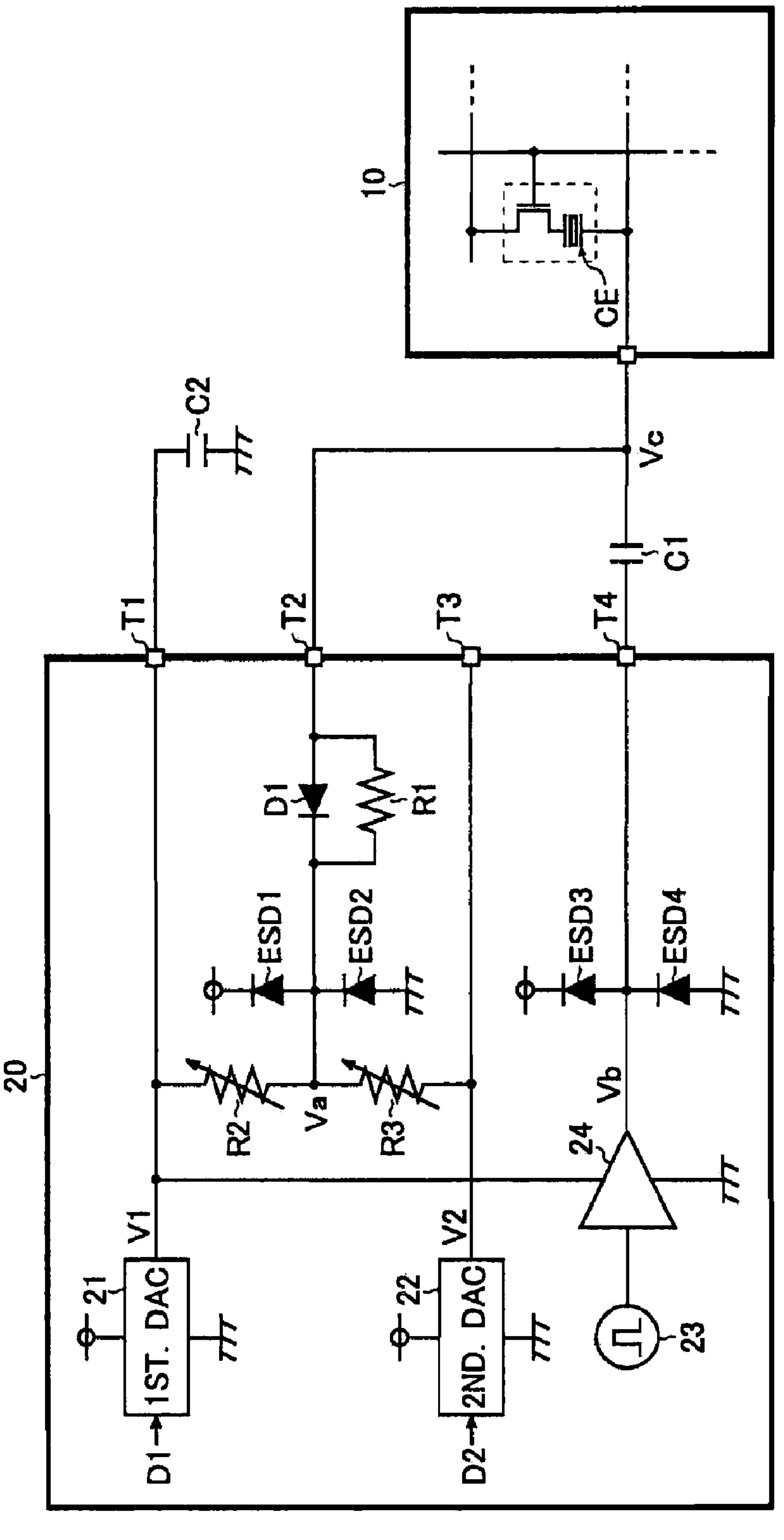
[FIG. 1] is a circuit block diagram showing a display apparatus as one embodiment of the present invention.

FIG. 1 is a circuit block diagram showing a display apparatus as one embodiment of the present invention.

As shown in FIG. 1, the display apparatus of this embodiment includes a liquid crystal panel 10 and a liquid crystal panel driving IC 20.

The liquid crystal panel 10 is configured such that a plurality of source signal lines and a plurality of gate signal lines are laid across in the vertical and horizontal directions, respectively, and liquid crystal pixels provided one at each intersection between two kinds of signal lines are driven as the corresponding active elements (field effect transistors) are turned on and off. As an example of liquid crystal panels of an active matrix type like this, a TFT (thin film transistor) liquid crystal panel can be cited.

The liquid crystal panel driving IC 20 incorporates: a first digital/analog converter 21 (hereinafter called "first DAC 21"); a second digital/analog converter 22 (hereinafter called "second DAC 22"); a pulse oscillator 23; an amplifier 24; a diode D1; resistors R1 to R3; and electrostatic protection diodes ESD1 to ESD4. It should be noted that the liquid crystal panel driving IC 20 of this embodiment together with externally attached capacitors C1 and C2 forms a liquid crystal driving apparatus that switches the polarity of a common voltage Vc (a so-called "common AC driving" type liquid crystal driving apparatus).

The first DAC 21 is a first voltage source that generates a first positive constant voltage (e.g., +4 [V]) by converting a digital signal D1 into an analog signal. Here, the output terminal of the first DAC 21 is connected to the positive power supply terminal of the amplifier 24, one end of the resistor R2 and a pad T1. And between the pad T1 and a ground terminal, the capacitor C2 for phase compensation is externally attached.

The second DAC 22 is a second voltage source that generates a second positive constant voltage V2 (e.g., +1 [V]) lower than the first constant voltage V1 by converting a digital signal D2 into an analog signal. The output terminal of the second DAC 22 is connected to one end of the resistor R3 and a pad T3.

The resistors R2 and R3 are mutually connected at the other ends thereof, and from their connection node, an intermediate voltage (e.g., +1.4 [V]) between the first and second constant voltages V1 and V2 is extracted as a positive constant voltage Va.

That is, in this embodiment, the above-mentioned first and second DACs 21 and 22 and the above-mentioned resistors R2 and R3 form a constant voltage generation section that generates the positive constant voltage Va.

It should be noted that this constant voltage generation section may be configured such that at least one of the first and second constant voltages V1 and V2 and the resistance ratio of the resistor R2 to the resistor R3 (the division ratio of the voltage division circuit) can be varied. This configuration makes it possible to generate the positive constant voltage Va as needed. For example, even when the first constant voltage V1 is fixed, it is still possible to set the constant voltage Va at a desired level, if one of the second constant voltage V2 and the resistors R2 and R3 can be varied.

The pulse oscillator 23 generates a reference pulse signal with the period of a frame and outputs it to the amplifier 24.

The amplifier 24 amplifies the reference pulse signal inputted from the pulse oscillator 23 and thereby generates the positive pulse voltage Va. As previously described, the positive power supply terminal of the amplifier 24 is connected to the output terminal of the first DAC 21 (the application end of the first constant voltage V1). The negative power supply terminal of the amplifier 24 is grounded. The output terminal of the amplifier 24 is connected to a pad T4.

That is, in this embodiment, the above-described pulse oscillator 23 and amplifier 24 form a pulse voltage generation section that generates the positive pulse voltage Va.

One end of the capacitor C1 is connected to the output terminal of the amplifier 24 (i.e., the output terminal of the pulse voltage generation section) via the pad T4. The other end of the capacitor C1 is, as an output terminal of a common voltage Vc, connected to a common electrode CE of the liquid crystal panel 10.

The anode of the diode D1 is connected to the other end of the capacitor C2 via the pad T2. The cathode of the diode D1 is connected to the connection node between the resistors R2 and R3 (i.e., the output terminal of the constant voltage generation section). And between both ends of the diode D1, the resistor R1 (approximately 1 [MΩ]) is connected in parallel thereto.

The anode of the electrostatic protection diode ESD1 is connected to the cathode of the diode D1. The cathode of the electrostatic protection diode ESD1 is connected to a power supply terminal. The anode of the electrostatic protection diode ESD2 is connected to a ground terminal. The cathode of the electrostatic protection diode ESD2 is connected to the cathode of the diode D1. The anode of the electrostatic protection diode ESD3 is connected to the pad T4. The cathode of the electrostatic protection diode ESD3 is connected to a power supply terminal. The anode of the electrostatic protection diode ESD4 is connected to a ground terminal. The cathode of the electrostatic protection diode ESD4 is connected to the pad T4.

Next, the operation of the liquid crystal panel driving IC 20 for generating the common voltage Vc will be described in detail with reference to FIG. 2.

Figure 2:
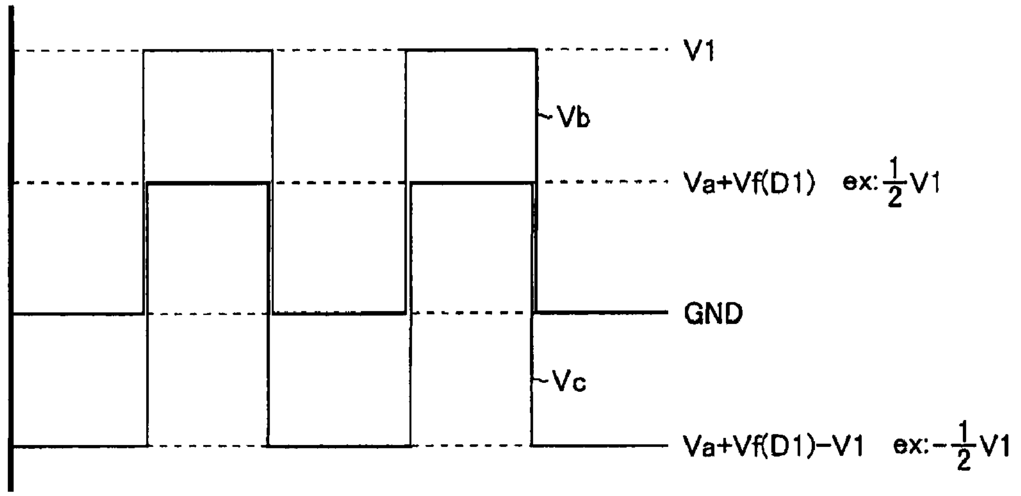
[FIG. 2] is a waveform diagram illustrating the operation for generating a common voltage Vc.

FIG. 2 is a waveform diagram illustrating the operation for generating the common voltage Vc. It should be noted that for convenience's sake FIG. 2 is drawn with a pulse voltage Vb slightly shifted from the common voltage Vc in terms of level shift timing; however, in reality their level shift timing coincides.

As previously described, to the amplifier 24 forming the pulse voltage generation section, the first constant voltage V1 is applied as a positive supply voltage and a ground voltage GND is applied as a negative supply voltage. Accordingly, the pulse voltage Vb shifts between the first constant voltage V1 and the ground voltage GND.

Here, when the pulse voltage Vb rises to High (i.e., to the level of the first constant voltage V1), from the output terminal of the amplifier 24, a current bound for the ground terminal starts to flow through the capacitor C1, the diode D1, the resistor R3 and the second DAC 22, and thus the common voltage Vc increases. However, the common voltage Vc is clamped at a voltage level (Va+Vf(D1)) higher than the constant voltage Va by the forward voltage drop Vf(D1) of the diode D1. For example, when Va=1.4[V], Vf(D1)=0.6[V] and V1=4.0[V], then Vc=(½)×V1. It should be noted that meanwhile the differential voltage (V1−(Va+Vf(D1))) between the pulse voltage Vb and the common voltage Vc is charged between both ends of the capacitor C1.

On the other hand, when the pulse voltage Vb falls to Low (i.e., to the level of the ground voltage GND), while the charge voltage (V1−(Va+Vf(D1)) of the capacitor C1 is maintained, a similar voltage drop occurs in the common voltage Vc as well. That is, the common voltage Vc decreases to (GND−(V1−(Va+Vf (D1))=(Va+Vf(D1)−V1). When the parameters given as an example above are applied here, then Vc=(−½)×V1. Thus, the voltage level is negative.

As previously described, in the display apparatus of this embodiment, the power supply apparatus that generates the common voltage Vc includes: the constant voltage generation section (the first and second DACs 21 and 22 and the resistors R2 and R3) that generates the positive constant voltage Va; the pulse voltage generation section (the pulse oscillator 23 and the amplifier 24) that generates the positive pulse voltage Vb; the capacitor C1 of which one end is connected to the output terminal of the pulse voltage generation section; and the diode D1 of which the anode is connected to the other end of the capacitor C1 and of which the cathode is connected to the output terminal of the constant voltage generation section. In this case, the positive-negative bipolar pulse voltage Vc is outputted from the other end of the capacitor C1.

Figure 6:
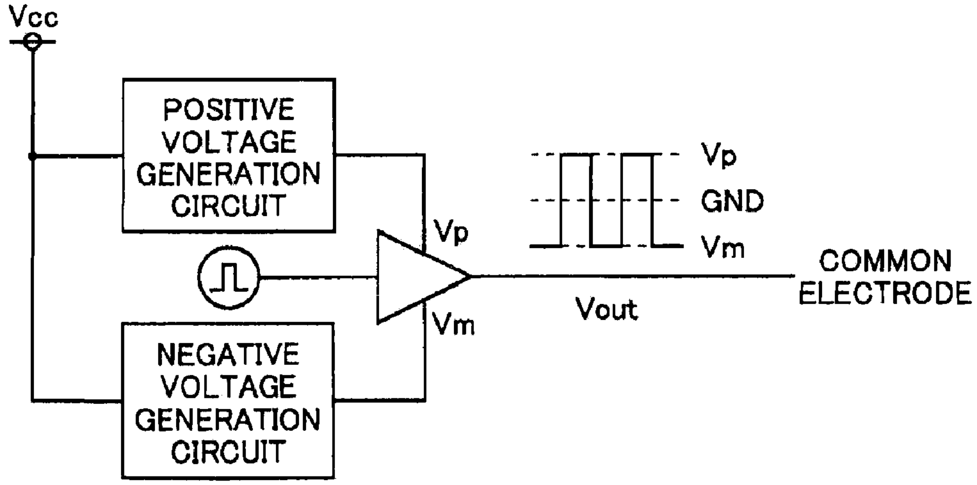
[FIG. 6] is a block diagram showing one conventional example of a liquid crystal driving apparatus.

This configuration makes it possible to generate a positive-negative bipolar common voltage Vc by use of only a positive supply voltage, thus eliminating the need for a negative voltage generation circuit as shown in FIG. 6. Hence, according to the present invention, it is possible to generate a positive-negative bipolar common voltage Vc with a simpler and smaller-scale circuit configuration. This contributes to miniaturization and slimming-down of, and hence cost reduction in, liquid crystal driving apparatuses and display apparatuses using such a common voltage.

It is possible to adjust the upper clamp level of the common voltage Vc as needed by setting the constant voltage Va appropriately. Also, it is possible to adjust the amplitude of the common voltage Vc as needed by setting the first constant voltage V1 appropriately.

In this embodiment, the diode D1 and the resistor R1 are integrated into the liquid crystal panel driving IC 20. This configuration, as compared with a configuration in which the diode D1 and the resistor R1 are externally attached, makes it possible to reduce the number of parts, and hence to reduce mounting cost, and to reduce substrate size or to increase the space available on the substrate. Also, from the perspective of characteristics, since the diode D1 and the resistor R1 can be put under the same production control as the liquid crystal panel driving IC 20, it is possible to make an optimum circuit design (one without excessive margins).

In a case where the diode D1 is incorporated in the liquid crystal panel driving IC 20, if simply a PN junction is formed on the semiconductor substrate, when the negative common voltage Vc is outputted, it may occur that an unwanted current flows in from the grounded semiconductor substrate and prevents the common voltage Vc from falling to a desired negative voltage level.

In order to address this, the diode D1 of this embodiment is so integrated into the liquid crystal panel driving IC 20 as to block the current path thereto from the semiconductor substrate.

Figure 3:
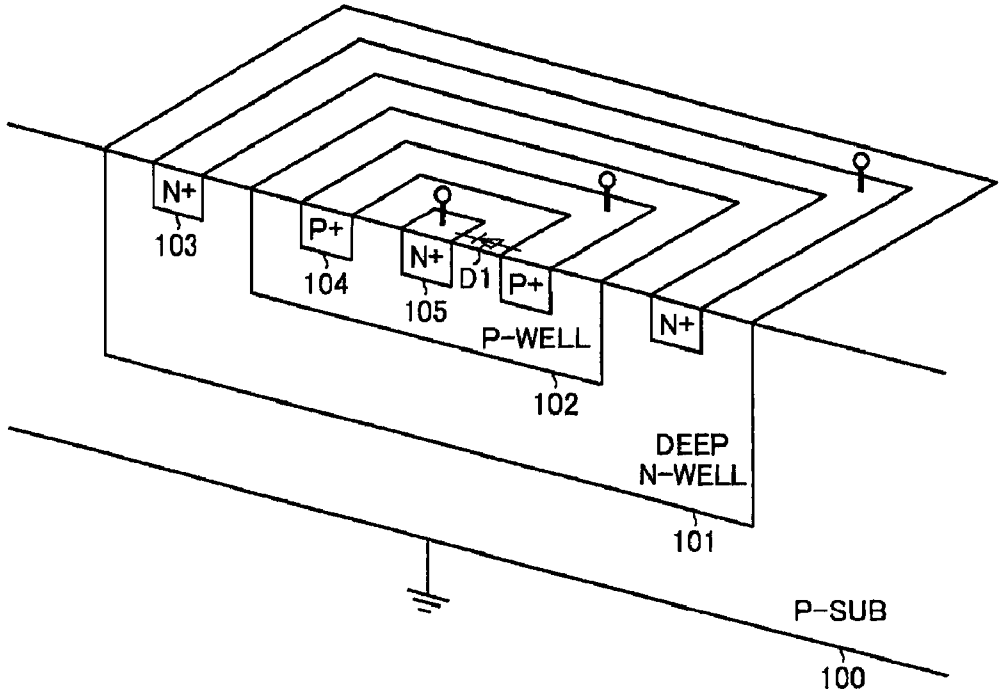
[FIG. 3] is a vertical cross-sectional view showing the structure of a diode D1.

FIG. 3 is a vertical cross-sectional view showing the structure of the diode D1 of this embodiment.

As shown in FIG. 3, a low concentration N-type semiconductor region 101 (hereinafter called "deep N-well 101") is formed in a P-type semiconductor substrate 100 (hereinafter called "P-sub 100") that is grounded. Inside the deep N-well 101, a low concentration P-type semiconductor region 102 (hereinafter called "P-well 102") is formed. Also, inside the deep N-well 101, a high concentration N-type semiconductor region 103 serving as a contact for the deep N-well 101 is so formed as to surround the P-well 102. On the other hand, inside the P-well 102, a high concentration P-type semiconductor region 104 serving as the anode of the diode D1, and a high concentration P-type semiconductor region 105 serving as the cathode of the diode D1 are formed separately.

Here, the above-mentioned high concentration N-type semiconductor region 103 is placed in a floating state or fed with a supply voltage. That is, the diode D1 of this embodiment is integrated into the liquid crystal panel driving IC 20 with the deep N-well 101 interposed therebetween so as to block the current path thereto from P-sub 100.

This configuration makes it possible to inhibit unwanted inflow of a current from the semiconductor substrate when the negative common voltage Vc is outputted, and thus makes it possible to decrease the common voltage Vc to a desired negative voltage level.

In the case where the diode D1 is incorporated in the liquid crystal panel driving IC 20, attention should be paid to where to connect the diode D1.

Figure 4:
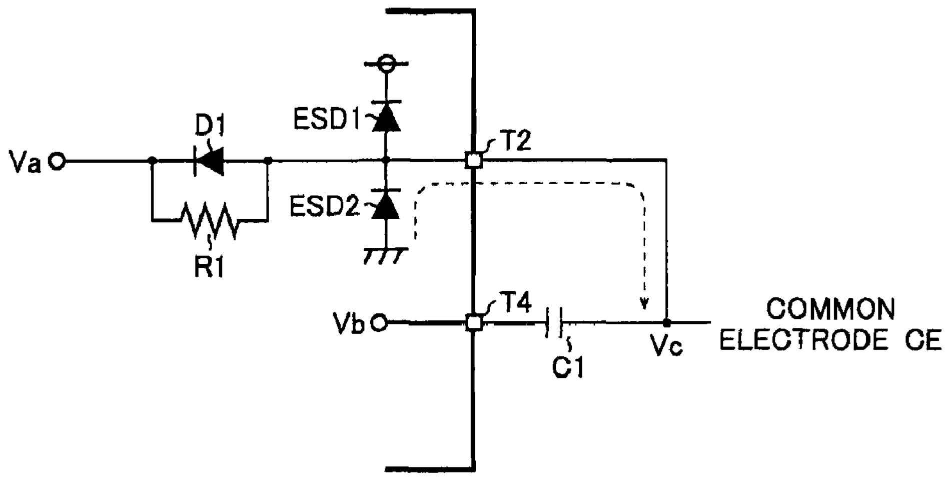
[FIG. 4] is a diagram illustrating the problem encountered in a case where the diode D1 is connected on the internal circuit-side of electrostatic protection diodes ESD1 and ESD2.

FIG. 4 is a diagram illustrating the problem encountered in a case where the diode D1 is connected on the internal circuit-side of the electrostatic protection diodes ESD1 and ESD2.

As shown in FIG. 4, in the case where the diode D1 is connected on the internal circuit-side of the electrostatic protection diodes ESD1 and ESD2, when the negative common voltage Vc is outputted, it may occur that an unwanted current flows in from the ground terminal via the electrostatic protection diode ESD2, thus clamps the common voltage Vc at (GND−Vf(ESD2)), and thus prevents it from falling to a desired negative voltage level.

In order to eliminate this failure, the lower-potential side of the electrostatic protection diode ESD2 needs to be set at a lower level than the common voltage Vc. This calls for the negative voltage generation section shown in FIG. 6, and accordingly makes it impossible to avoid a complicated circuit design and an increased chip size.

Figure 5A:
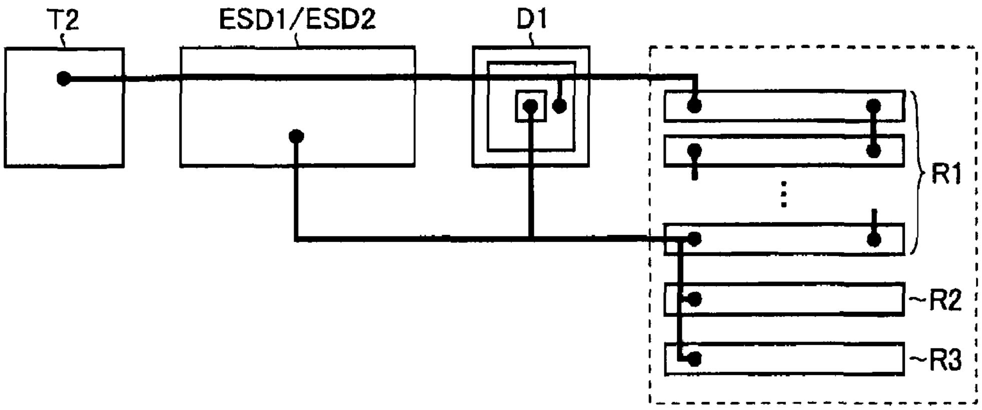
[FIG. 5A] is a layout diagram illustrating the positional relationship and interconnection between the diode D1 and the electrostatic protection diodes ESD1 and ESD2.
Figure 5B:
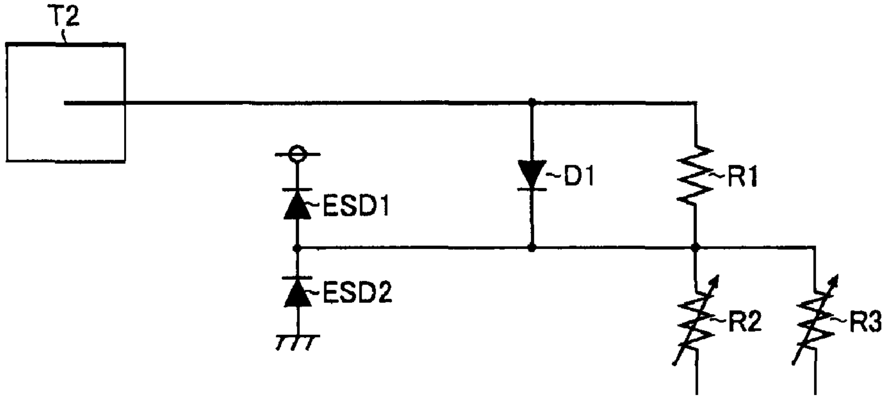
[FIG. 5B] is an equivalent circuit diagram illustrating the positional relationship and interconnection between the diode D1 and the electrostatic protection diodes ESD1 and ESD2.

Therefore, as shown in FIGS. 5A and 5B, the liquid crystal panel driving IC 20 of this embodiment is configured such that the diode D1 is connected on the pad T2-side of the electrostatic protection diodes ESD1 and ESD2; that is, the driving IC 20 is so configured as to have the electrostatic protection diodes ESD1 and ESD2 on the cathode side of the diode D1.

FIGS. 5A and 5B are diagrams illustrating the positional relationship and interconnection between the diode D1 and the electrostatic protection diodes ESD1 and ESD2. FIG. 5A shows the layout of components on the liquid crystal panel driving IC 20, and FIG. 5B shows their interconnection at the circuit level.

As shown in FIGS. 5A and 5B, when viewed in terms of component layout on the driving IC 20, the pad T2, the electrostatic protection diodes ESD1 and ESD2, and the diode D1 are arranged in this order such that the diode D1 is connected on the internal circuit-side of the electrostatic protection diodes ESD1 and ESD21; when viewed at the circuit level, the diode D1 is connected on the pad T2-side of the electrostatic protection diodes ESD1 and ESD2.

This configuration makes it possible to inhibit unwanted inflow of a current from the ground terminal when the negative common voltage Vc is outputted, thus allowing the common voltage Vc to fall to a desired negative voltage level.

When the above-described configuration is adopted, the diode D1 is directly connected to the pad T2. Accordingly, it is preferable that the diode D1 be protected against static electricity. More specifically, in order to provide the diode D1 with a sufficient current capability against a high voltage surge, it is preferable that the diode D1 be designed with substantially the same element size as that of the electrostatic protection diodes ESD1 to ESD4 (see FIG. 5A). This configuration makes it possible to prevent the diode D1 from being broken due to a high voltage surge.

Although the above-described embodiment deals with, as an example, a configuration in which a power supply apparatus is employed as a means for generating a common voltage fed to a liquid crystal panel, this is not meant to limit the application of the present invention; the present invention can also be applied to power supply apparatuses in general that output a positive-negative bipolar pulse voltage, for example to a means for generating an auxiliary voltage fed to liquid crystal panels.

The present invention may be carried out in any way other than specifically described by way of an embodiment above, and allows many modifications and variations within the spirit of the invention.

For example, although the above-described embodiment deals with a configuration in which a constant voltage Va for setting the upper clamp level of a common voltage Vc is generated by use of a constant voltage generation section composed of first and second DACs 21 and 22 and resistors R2 and R3, this is not meant to limit how the present invention is carried out; the present invention may adopt any other configuration that makes it possible to obtain the constant voltage Va at a desired level.

Industrial Applicability

The present invention provides a useful technology for miniaturization and sliming-down of driving apparatuses for liquid crystal panels used as a display means in mobile phone terminals, portable game devices, personal digital assistants (PDA), car audio apparatuses and the like.

The invention claimed is:

1. A power supply apparatus comprising:

a constant voltage generation section that generates a positive constant voltage:

a pulse voltage generation section that generates a positive pulse voltage:

a capacitor one end of which is connected to an output terminal of the pulse voltage generation section;

a diode including an anode connected to another end of the capacitor, and including a cathode connected to an output terminal of the constant voltage generation section; and an electrostatic protection element one end of which is connected between the cathode of the diode and the output terminal of the constant voltage generation section, wherein a positive-negative bipolar pulse voltage is provided from the other end of the capacitor, wherein the pulse voltage generation section, the constant voltage generation section, the diode and the electrostatic protection element are incorporated in a semiconductor integrated circuit device, and the capacitor is externally attached to the semiconductor integrated circuit device.

2. The power supply apparatus of claim 1, wherein the diode is so integrated as to block a current path thereto from a semiconductor substrate.

3. The power supply apparatus of claim 1, wherein the diode is connected on a pad side of the electrostatic protection element.

4. The power supply apparatus of claim 1, wherein the diode has substantially a same element size as the electrostatic protection element.

5. The power supply apparatus of claim 1, wherein the constant voltage generation section includes:

a first voltage source that generates a first constant voltage;

a second voltage source that generates a second constant voltage lower than the first constant voltage; and a voltage division circuit that generates an intermediate voltage between the first and second constant voltages, wherein the constant voltage generation section outputs the intermediate voltage as the positive constant voltage, wherein at least one of the first constant voltage, the second constant voltage and a division ratio of the voltage division circuit is variable.

6. A liquid crystal driving apparatus that switches, every frame period, a polarity of a common voltage fed to a liquid crystal panel, the driving apparatus comprising the power supply apparatus of claim 1 as a means for generating the common voltage.

7. A display apparatus provided with a liquid crystal panel, the display apparatus comprising the liquid crystal driving apparatus of claim 6 as a means for switching, every frame period, a polarity of a common voltage fed to the liquid crystal panel.

* * * * *